G. W. KAUSER.
CAMERA.
APPLICATION FILED APR. 3, 1920.

1,406,653.

Patented Feb. 14, 1922.
5 SHEETS—SHEET 1.

Inventor
George W. Kauser
by Clarence E. Mehlhope, Atty.

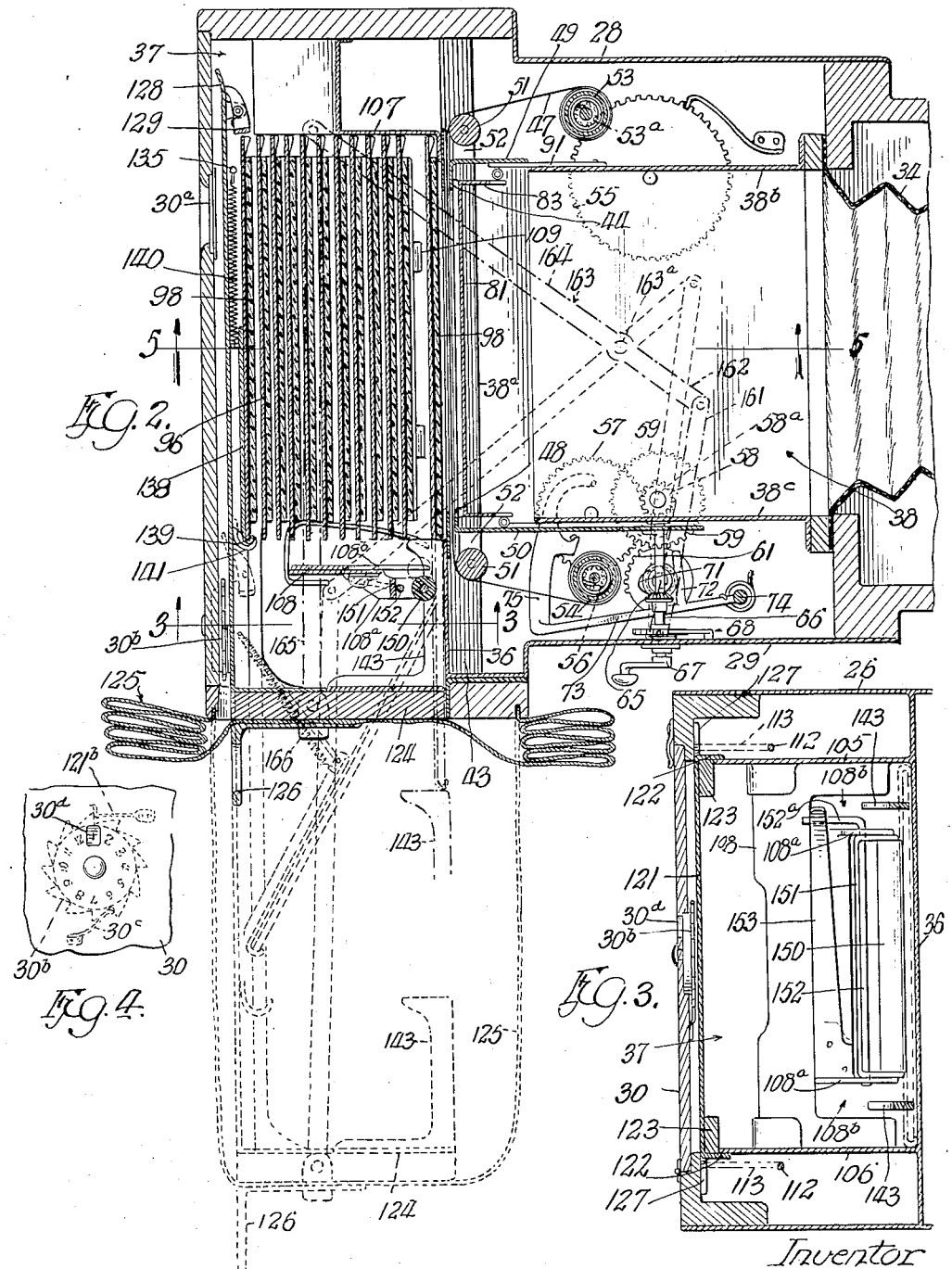

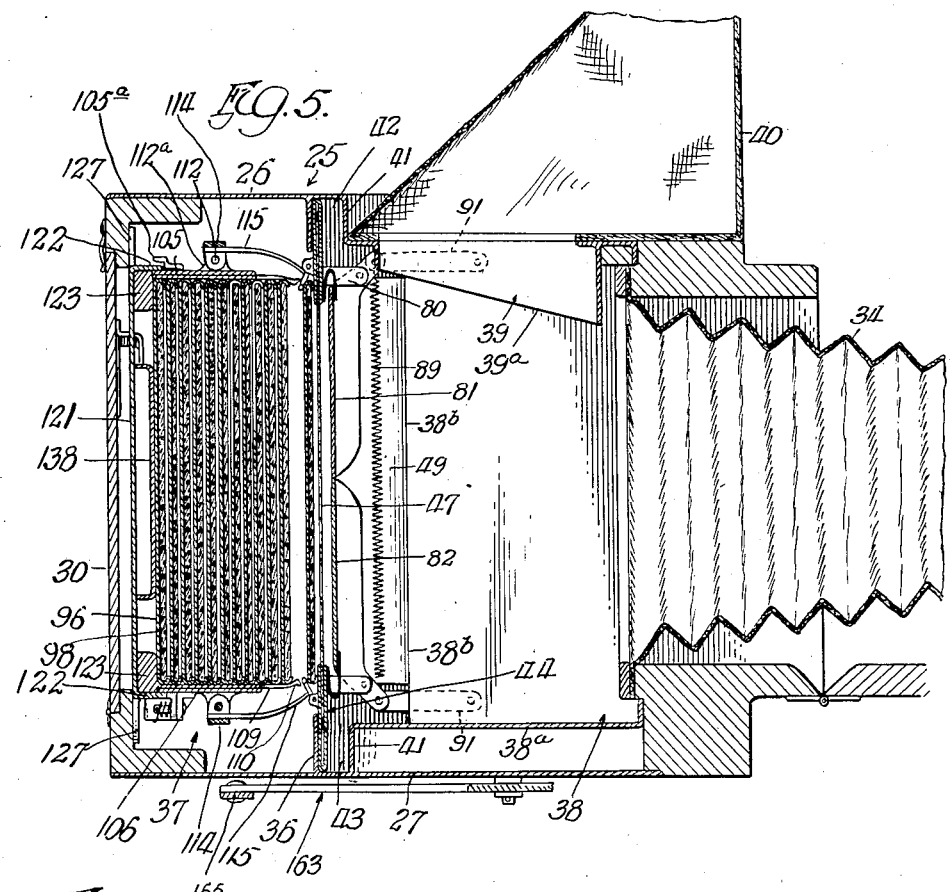

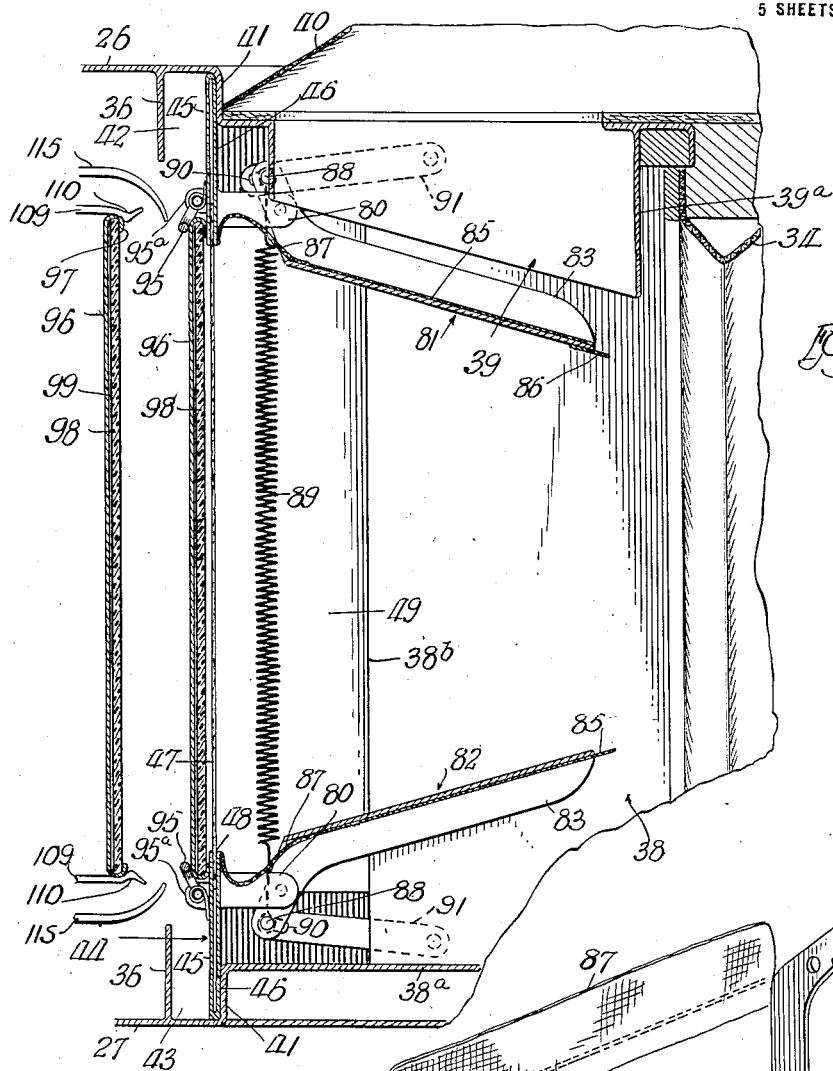
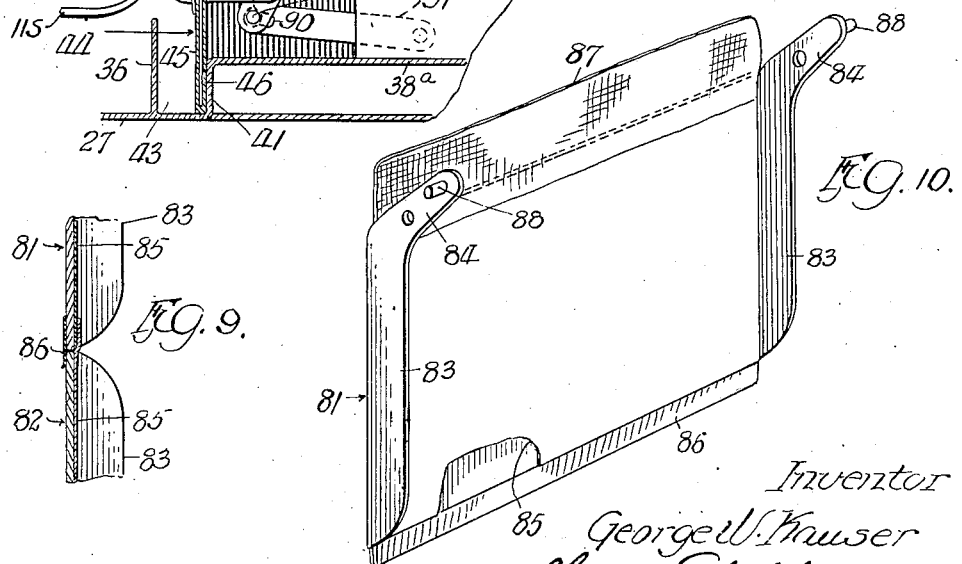

Inventor
George W. Kauser

UNITED STATES PATENT OFFICE.

GEORGE W. KAUSER, OF CHICAGO, ILLINOIS.

CAMERA.

1,406,653. Specification of Letters Patent. Patented Feb. 14, 1922.

Application filed April 3, 1920. Serial No. 370,985.

*To all whom it may concern:*

Be it known that I, GEORGE W. KAUSER, a citizen of the United States, and a resident of Chicago, in the county of Cook and State of Illinois, have invented certain new and useful Improvements in Cameras; and I do hereby declare that the following is a full, clear, and exact description thereof, reference being had to the accompanying drawings and to the letters of reference marked thereon, which form a part of this specification.

This invention relates to improvements in cameras and consists of the matters hereinafter described and more particularly pointed out in the appended claims.

One of the objects of this invention is to provide a construction whereby the entire operation of a camera is controlled through one operating member, thus eliminating the possibility of making a second exposure on the sensitized member, or skipping one exposure area without making an exposure thereon, or rewinding the focal plane shutter in case one is used while the sensitized member is not protected, thus making the camera fool-proof and making it capable of much more rapid operation.

Another object of the invention is to provide a novel construction for changing the plates in a camera where the plates are retained in a magazine in the back part of the camera.

Another object of the invention is to provide an improvement in reflex cameras wherein the image is focussed directly on a white screen, visible from without the camera instead of on ground glass through the medium of a mirror as heretofore. The vagueness of outline and loss of light in prior constructions is thus eliminated. As a result, short focus or wide angle lenses may be used with the same advantage that other lenses are used. In addition, the camera may be made smaller and more compact.

These and other advantages of my improved camera will appear more fully as I proceed with my specification.

In the drawings:—

Figure 2 is a longitudinal, horizontal, section through the camera, in a plane indicated by the line 2—2 of Figure 1.

Figure 3 is a vertical, detail section through the camera, in a plane indicated by the line 3—3 of Figure 2.

Figure 4 is a detail view of a plate counting device embodied in my invention and which will be more specifically referred to later.

Figure 5 is a longitudinal, vertical, section of the camera, in a plane indicated by the line 5—5 of Figure 2.

Figure 6 is a perspective view of a sensitized-plate holder, with the sensitized plate therein.

Figure 7 is a detail view in elevation of a part of the means for yieldingly holding the plate-holder in engagement with the shutter frame.

Figure 8 is an enlarged detail, longitudinal, vertical section through parts of the camera illustrated in Fig. 5 but with several of said parts shown in changed relation.

Figure 9 is an enlarged, vertical detail section through the abutting ends of the reflex screen.

Figure 10 is a perspective view of one of the parts of the reflex screen.

Figure 1:
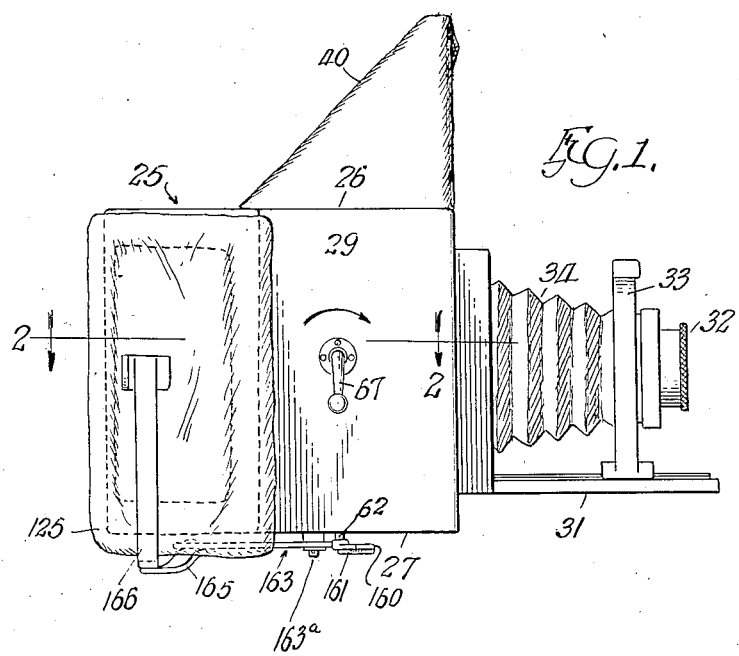
Figure 1 is a view in side elevation of a camera embodying the novel features of my invention.
Figure 13:
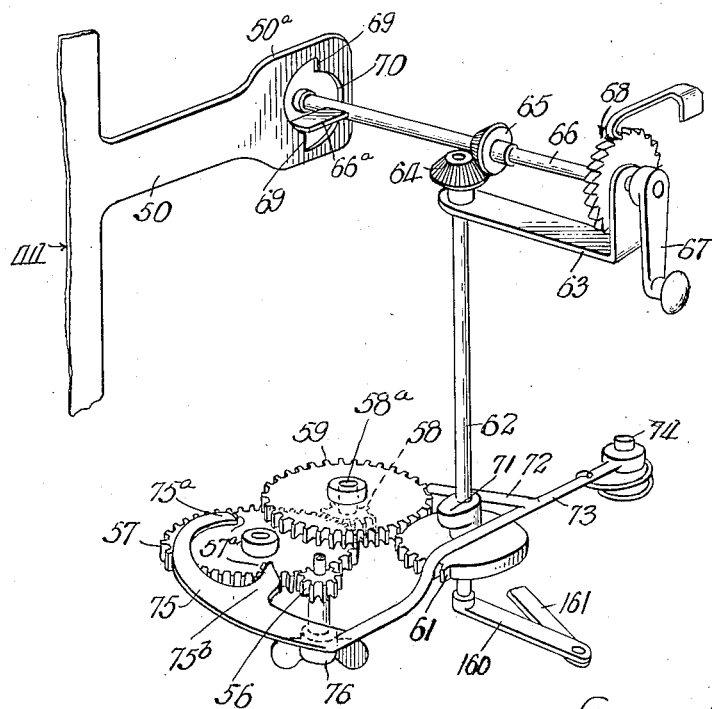
Figure 13 is a perspective view of the mechanism, connecting the operating handle and the plate-changer.

In illustrating my invention, I have shown the several novel features applied to a reflex camera having a focal plane shutter, in which plates provide the sensitized member. As will be apparent, however, said features are not all limited to such application, but are capable of use in cameras of other types.

Referring now in detail to that embodiment of the invention illustrated in Figures 1 to 13 inclusive, of the accompanying drawings, 25 indicates the casing of a camera of the folding type. Said casing is an open-end box, made of wood and metal, with top and bottom walls 26, 27 and side walls 28, 29 respectively. The opening at the rear end of the casing is closed by a hinged door 30, which seats in a light-proof rabbet formed about the opening and which is held in closed position by a spring latch. (See Fig. 5). 31 indicates the hinged door at the front opening in the casing (see Fig.

1) which provides support for the lens and its standard 32, 33, when the bellows 34 is withdrawn from the casing.

The casing 25 is divided transversely by a vertical, open frame 36 (see Fig. 5) into a rear plate-holding compartment 37 and a focal chamber 38. The focal chamber 38 is otherwise defined by a horizontal wall 38ª, spaced above the bottom wall 27 of the casing (see Fig. 5) and by vertical side walls 38ᵇ and 38ᶜ, spaced inwardly from the side walls 28, 29 of the casing. (See Fig. 2). The two side walls extend vertically to the top wall of the casing, and the three walls 38ª, 38ᵇ, and 38ᶜ extend forwardly to the rear large end of the bellows 34, where they are attached to the usual frame which supports the bellows. Said walls terminate at their rear ends short of the open frame 36.

At the top of the focal chamber 38, is an open frame 39 with depending flanges 39ª, through which may be observed the reflection of the view to be taken, as will presently appear. A collapsible hood 40 of familiar construction, is secured to the top wall of the camera casing about the open frame 39 for the purpose of shading the eyes of the observer when looking at the reflection in the focal chamber. The hood when collapsed, closes the open frame 39 and closes the focal chamber against the entrance of light.

I provide in the focal plane of the camera, a reflection screen, which may be viewed through the opening in the frame 39, and upon which the image may be focused when a picture is to be taken. The sensitized member will, of course, be back of this screen and when the screen is removed from in front of the exposure area, in order to make an exposure, as will presently be described, the sensitized member must be brought to focus. Manifestly this may be done either by moving the lens back a distance equal to the distance that the sensitized member is spaced back of the reflection screen, in order to shift the focal plane to the plane of the sensitized member, or the sensitized member itself may be moved to bring it into a fixed focal plane, which was heretofore occupied by the reflection screen. In the modification of the invention embodied herein, I have shown a camera in which the focal plane is fixed and the sensitized member is made movable to bring it into that plane—the lens being immovable.

The top and bottom walls of the camera casing have vertical flanges 41 which are spaced in front of the open frame 36 a short distance and which, with said frame, define top and bottom light wells 42 and 43 respectively. In said wells is located a focal shutter frame 44 which is capable of a forward and backward movement therein.

The shutter frame as shown, is made of sheet metal and has spaced, open plates 45 and 46 (see Fig. 8) which provide a guide for the passage of the shutter band or strip 47. 48 indicates the exposure opening in the shutter frame. The front plate 46 of the shutter frame has vertical, forward extending flanges (see Fig. 2) 49, 50 at its sides. Both flanges are located without the focal chamber 38 and beyond its side walls 38ᵇ—38ᶜ which they overlap in the forward movement of the shutter frame. 51—51 indicate the shutter guide rollers which are mounted at each side of the shutter frame (see Fig. 2) on suitable bearing ears 52 projecting at top and bottom from the side flanges 49, 50.

The wind and rewind rolls 53, 54 of the shutter are mounted in suitable bearings in the top and bottom walls of the casing in the vertical spaces at either side of the focal chamber. The roller 53 is the rewind and spring tension roller and has a pinion 53ª on its bottom end (see Fig. 2) which is engaged by the tension gear 55 on the bottom wall of the casing 25. The other roller 54 has at its bottom end, a pinion 56, that meshes with the usual escapement gear 57 mounted on the bottom wall 27 of the casing.

The escapement gear 57 is engaged by a pinion 58 (see Fig. 13) on a stud shaft 58ª journaled in the bottom wall 27 of the casing and in the bottom wall 38ª of the focal chamber. 59 indicates a large gear fixed to the stud shaft 58ª above the pinion 58. Said gear 59 is actuated by a segmental gear 61 keyed to an upright shaft 62, located in the vertical space between the side wall of the camera and the adjacent side wall of the focal chamber. Said shaft is journaled in the bottom wall of the casing and in a bracket 63 attached to the side wall 29 of the camera.

At the top end of the shaft 62 is fixed a bevel pinion 64 which meshes with a like pinion 65 on a horizontal shaft 66 journaled at one end in the wall 38ᶜ of the focal chamber and at its end in the bracket 63. The shaft 66 extends through the camera side wall 29 where it is provided with a crank handle 67. A back ratchet and pawl 68, just inside of the camera wall 29 locks the shaft 66 against movement other than in one direction, namely as shown, in a clockwise direction.

The shaft 66, by its rotation, actuates the shutter frame 44 to move it forward and backward in a familiar manner. As shown, the inner end of said shaft carries a radial, flat finger 66ª which is adapted to alternately engage oppositely disposed vertical shoulders 69, defined in a cam opening 70 in an extension 50ª of the flange 50 at the adjacent side of the shutter frame. Thus with the parts in the position shown in Fig.

13, the finger 66ª will swing without moving the shutter frame until it engages the top shoulder 69, when its further movement will act to pull the shutter frame forward until said finger passes said shoulder. The shutter frame then remains at rest until, in the further rotation of the shaft, the finger 66ª engages the bottom shoulder 69, whereupon it will act to push the shutter frame back to its original position.

Fixed to the vertical shaft 62 near the segmental gear 61 is a cam 71. Said cam is adapted to engage a lateral extension 72 on a spring tensioned pawl arm 73, pivoted on a stud 74, rising from the bottom wall 27 of the casing. The arm 73 has at its end a second lateral extension 75 which carries the familiar escapement fingers 75ª, 75ᵇ that normally engage with studs 57ª on the escapement gear 57. At the bottom end of the shaft of the shutter roller 54 and below the bottom wall 27 of the casing is fixed the usual thumb nut 76 (see Fig. 13) by means of which the shutter web 47 may be wound by hand to determine the shutter opening to be used for an exposure.

The mechanism thus described operates as follows (see Fig. 13): The rotation of the shaft 62 by means of the crank 67, will, through the segmental gear 61 and its connected train of gearing including the escapement gear 57, operate the shutter to set the desired shutter opening in the usual manner. The finger 66ª then operates to move the shutter frame forward, bringing, as will be later pointed out, the sensitized member into the focal plane of the camera. The cam 71 then strikes the extension 72 on the escapement arm 73 and momentarily releases the escapement gear 57 to permit the operation of the shutter to make an exposure. The finger 66ª then operates to return the shutter frame to the focal plane, when all the parts come to their initial position on completing the rotation of the crank 67.

On the shutter frame and in front of the opening therein is mounted a reflection screen (see Figs. 5 and 8) which may be viewed through the collapsible hood 40 and the open frame 39 at the top of the focal chamber. Said screen is normally located in the focal plane of the camera and as shown, is in two sections 81, 82, which are hinged, one at the top and the other at the bottom and which overlap when closed, at the middle of the shutter opening to provide a continuous screen surface. Each screen section is in the form of a flat plate having side flanges 83 (see Fig. 10) which include angularly disposed arms 84 that are pivoted to ears 80 at the top and bottom of the shutter frame and within the plane of its side flanges 49, 50, as clearly shown in Fig. 8.

The screen plates are each of a width slightly greater than that of the exposure opening in the shutter frame and the combined vertical height of both of said plates approximates the height of the said exposure opening. Normally, said screens are maintained in a vertical position, covering the exposure opening of the shutter frame and each screen has provided on its front face, a white ground, as shown, in the form of sheets of white paper 85 adhered thereto. The paper 85 of the bottom screen overlaps the proximate edge of the top screen section and the top screen section has a strip of flexible material 86 fixed to its rear face to overlap the rear face of the top edge of the bottom screen section. Thus a light-tight joint is formed at the meeting ends of said screens when they are in the position closing the exposure opening in the shutter frame as shown in Figs. 5 and 9. Strips of black cloth 87—87 connect the top and bottom edges of the screens with the shutter frame as an additional prevention against the leakage of light.

The screen sections, when in upright, normal position present a bright white surface upon which is reflected the scene or picture to be taken. This reflection, although presented upside down with respect to the camera, appears right side up to the observer looking through the hood. The reflection is on the same scale as that of the picture to be taken, because the screen, when in use, occupies the focal plane of the camera.

The screen sections are capable of a forward swinging movement to uncover the focal shutter opening as shown in Fig. 8. To this end, the following mechanism is provided:—The arms 84 on the screen sections project forwardly (when the screen sections are in vertical position) beyond their pivotal connections with the shutter frame and carry at their ends outwardly-extending pins 88. The pins 88 of the top screen section are connected to the like pins of the bottom section by contractile springs 89. Said pins also engage in slots 90—90 in the rear ends of top and bottom horizontal links 91, the forward ends of which are pivoted to the side walls 38ᵇ of the focal chamber 38. The parts are so arranged that when the screen sections 81, 82 are in their normal upright position, as shown in Fig. 5, the pins 88 of the top screen section engage at the rear ends of the slots 90 in the top links 91 and the pins 88 of the bottom screen section engage at the forward ends of the slots in the bottom links 90. When the screen sections 81, 82 are in the open position shown in Fig. 8, the pins 88 are reversed, those of the top screen section being at the forward ends of the associated slots 90 and those of the bottom screen section being at the rear ends of the associated slots 90.

By the construction described, the screen sections are caused to open or close in and by means of the movement of the shutter frame and the action of the springs 89. When the shutter frame is moved forwardly to bring a sensitized member into the focal plane, as will presently be described, the screen sections are swung forwardly on their pivotal connections with the links 91, by reason of the connection of their arms 84 with the shutter frame ears 80, until the springs 89 at the ends of the arm pass rearwardly beyond said pivotal connections, when the springs contract and swing the screen section into the open position shown in Fig. 8,—the links 91 controlling and limiting the movement. In a like manner, a rearward movement of the shutter frame causes the screen sections to swing downward to their normal closed position. On account of the slots 90 and the lost motion thus provided, one of the screen sections, the bottom screen section, as illustrated herein, will open first, the top screen section following thereafter; and when the screen sections are closed, the other screen section, in this case the top screen section, will close first and the bottom section will follow, thus permitting the proper engagement of the light-sealing members at the adjoining edges of the screen sections, as heretofore described.

At the top and bottom and at the back of the shutter frame (Fig. 8) are provided spring controlled clips 95, for releasably securing to said frame a septum or sensitized plate holder 96, such as shown in perspective in Fig. 6. Said clips are hinged to ears 95ª on the rear plate of the shutter frame. (see Fig. 7.) The septum is a rectangular piece of sheet metal, the top and bottom margins of which are bent forwardly and downwardly to provide oppositely facing flanges 97, which define grooves to receive the top and bottom edges of a sensitized glass plate 98. The septum is faced with a sheet of paper 99, to prevent scratching of the sensitized plate as it is inserted into the grooves from the left hand margin of the septum as viewed in Fig. 6. The septum has a marginal extension 100, at one side for the purpose of handling it. At the opposite side, it has a forward extending flange 101, which acts as a stop for the sensitized plate when it is inserted into the septum. The septums are provided on their backs with numerical characters (see Fig. 11) to indicate their order in succession in the magazine.

In the plate compartment 37, back of the plate holder which is attached to the shutter frame, is located a magazine for holding a plurality of loaded plate holders. The magazine consists of an open frame having top and bottom walls 105, 106 respectively, and left and right hand side walls 107 and 108 respectively, all of which are spaced inwardly from the corresponding walls of the camera casing. The left hand wall is attached to the adjacent wall of the camera casing and holds the magazine frame in position with the rear of the frame spaced from the rear door 30 and with the front ends of its top and bottom walls 105, 106 spaced back from the shutter frame.

To said top and bottom walls of the magazine frame are secured pairs of forwardly extending, spring fingers or supports 109, the fingers of each pair being placed at each side of the longitudinal median axis of the camera. The ends of said fingers or supports terminate a short distance to the rear of the shutter frame and have shoulders or grips 110 which are adapted to engage and hold the top and bottom edges of the septum which is at the front end of the magazine. (See Fig. 5.)

The magazine frame with its fingers 109, is designed to hold a plurality of loaded plate holders or septums, as for example, one less than a predetermined number that is to constitute a load (eleven when the load is twelve). The plate-holders in the magazine, are actuated in the following way: The extra plate-holder, as the twelfth, is held by the clips 95 on the shutter frame as before described. After the plate on the shutter frame has been exposed, the rearmost plate-holder (with an unexposed plate) is withdrawn from the magazine; the stack of plate holders in the magazine are moved rearwardly to make room for the one on the shutter frame, which is transferred to the front end of the magazine; and the plate-holder already withdrawn from the rear end of the stack is transferred to the exposure position on the shutter frame. The mechanism for bringing about this movement will now be described.

In ears 112ª (see Figs. 5 and 11) on the top and bottom walls 105—106 of the magazine frame are mounted rock shafts 112, which extend laterally toward the right hand side of the plate compartment, where they terminate in rearwardly extending arms 113, as shown in dotted lines in Figure 3. Attached to and movable with said rock shafts 112, are horizontal frames 114, each of which has a pair of laterally spaced, forwardly extending fingers 115, the front ends of which are inclined; those at the top, downwardly, and those at the bottom, upwardly, to points located shortly above and below respectively, in readiness to engage the top and bottom edges of the septum releasably held on the shutter frame,—being normally held in this position by means of coiled springs 116 on the rock shaft 112. The fingers 115 are so formed that, when they are pressed towards the septum on the shutter frame, the top and bottom edges of which septum are held by the spring controlled clips 95, said fingers will force the septum from the yielding grip of said clips, and will move it rearwardly until it is engaged and held by the grips 110 on the magazine spring fingers 109,—the rest of the septums in the magazine being forced back by it to make room for its entrance, the rearmost septum having been withdrawn.

Figure 12:
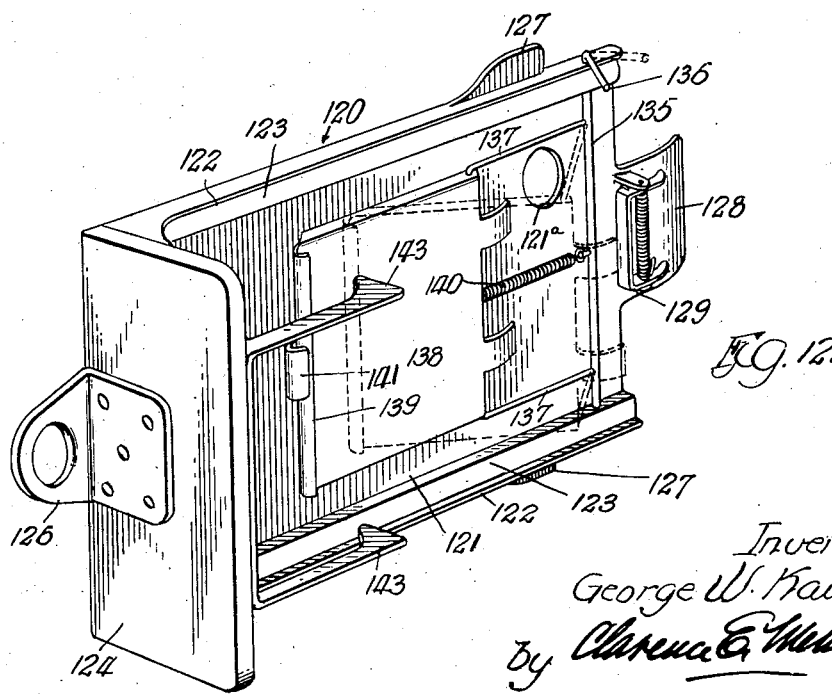
Figure 12 is a perspective view of a plate changer embodied in my improved construction.

At the back of the plate compartment, in the space between the rear door 30 and the rear end of the magazine frame, is located a slidable plate-changer 120 (see Fig. 12). This consists of a rectangular plate 121 having forwardly extending top and bottom flanges 122 which have sliding bearing on the rear marginal parts of the top and bottom magazine frame members 105—106. As shown in Figs. 5 and 12, the top and bottom edges of the plate changer are preferably reinforced and stiffened by bars, 123. To the right hand end of said plate-changer is secured an end member 124, which, when the plate-changer is in its normal position, closes an opening in the camera casing which gives access to the plate compartment. A collapsible bag 125 is secured to said end member 124 and to the part of the camera casing about the opening which it closes, in order to seal the plate-changer against the entrance of light during the operation of the plate-changer. A finger-hold plate 126, attached to the outer face of end member 124 serves as a grip to operate the plate changer, when it is manually operated.

On the top and bottom flanges 122 of the plate-changer, near the inner end thereof, are cams 127 which, when the plate-changer is moved outwardly and when it is almost at the end of its outward movement, will engage the rearwardly extending arms 113 of the rock-shafts 112 before referred to, so as to rock said shafts to actuate the fingers 115 thereon to remove the septum held on the shutter-frame and to transfer it to the magazine as already described.

At the inner end of said plate-changer is an extension 128 which carries a spring controlled abutment 129 adapted to rock upon a vertical axis. Said abutment, when the plate-changer is in its normal position, stands in line with and adjacent to the flange 101 of the rearmost septum in the magazine and when the plate-changer is withdrawn from the plate compartment, said abutment will engage said flange and force the septum out with the plate-changer.

135 indicates an upright rock shaft which is journalled in the brace bars 123 of the plate changer near its inner end. The top end of said shaft is bent forwardly to provide a rock arm 136. Vertically spaced, horizontal arms 137, are fixed to the shaft and extend toward the outer end of the plate-changer. The free ends of said arms are pivotally connected to the inner end of a shifter plate 138, which normally stands back of the rearmost septum in the magazine. At the outer end of said plate is a hooked flange 139, which, when the plate changer is in its normal position in the plate compartment, will engage the outer edge of the rearmost septum. A coiled, contractile spring 140 connects the shaft 135 with a point on the shifter plate 138 located a somewhat greater distance from said shaft 135 than the axes of the pivotal connections of the arms 137 with said plate. This spring acts to assist in moving the shifter plate from its parallel position with respect to the plate-changer 121, to the position shown in dotted lines in Fig. 12. The outer end of the shifter plate is normally engaged beneath a hook 141 on the plate changer.

Upon withdrawal of the plate-changer, just as it approaches the outermost limit of its movement, the arm 136 of the rock shaft 135 will engage a fixed pin 142 (see Fig. 11) depending from the top wall of the camera casing, whereupon a further withdrawal will rock the shaft 135 to swing the arms 137 forwardly and with them, the inner end of the shifter plate into the position shown in dotted lines in Figs. 2 and 12, the spring 140 assisting as before pointed out.

There is mounted on the vertical wall 108 of the magazine (see Figs. 2 and 3) adjacent to the plate 36, which divides the plate compartment from the focal chamber, a vertically extending spring controlled guide roller 150. Said roller is spaced from the said plate a distance sufficient for the end 101 of the septum to be engaged between it and the plate 36, when said septum end (the septum having been swung into the position shown by the dotted lines as last stated) is moved inwardly in the initial movement of the plate shifter 120, upon its return movement to its normal, closed position.

Said roller 150, is mounted in any suitable manner, so as to yield somewhat away from the plate 36, and inwardly toward the center of the camera, to permit the septum to be moved and guided between it and said adjacent plate, towards and finally into a position parallel to said plate,—said roller holding the septum against said plate 36 during this movement. As shown, said roller is mounted in a swinging frame 151, which is fixed to an upright shaft 152, journaled in ears 108ª, extending horizontally from the vertical magazine wall 108. A vertically disposed flat spring 153, fixed at the bottom to the side wall 108 of the magazine, has its top end engaged against a horizontal arm 152ª at the top of the shaft 152,—said spring providing for the yielding movement of the roller frame 151.

When the plate changer has been moved inwardly a certain distance, the septum, by reason of its engagement between the roller 150 and the wall 36, will be swung into and held in a plane parallel with and adjacent to said wall 36. Upon further inward movement of the plate changer, the outer end of said septum will be engaged by inwardly extending top and bottom pusher bars 143, provided on the end member 124 of the plate changer (as shown in dotted lines in Fig. 2) which pusher bars will complete the inward movement of the septum.

As the plate changer is moved inwardly, the arm 136 of the shaft 135 will strike the outer end of a flanged plate 105ª fixed to the rear margin of the top wall 105 of the magazine frame (see Fig. 5). This will produce a rocking movement of the shaft 135 so as to swing the shifter plate 138 back into its original position, parallel with the body 121 of the plate changer.

As the septum moves inwardly with the plate changer, its top and bottom edges will engage beneath the spring controlled clips 95, on the shutter frame. Openings 108ᵇ are provided in the vertical magazine wall 108, in line with the pusher bars 143, which are located above and below the roller 150, so as to permit said pusher bars to move the septum into the desired position with its center in the focal alignment of the camera. When the outer end of the septum passes the roller 150, said roller will be returned by the spring 153 to its normal position; the spring controlled abutment 129, on the plate changer, will yield to pass behind the rearmost septum in the stack, and when the plate changer has come to its normal position, will snap into engagement with the inner end 101 of said septum; and the hook 141 on the plate shifter 138, will engage the front end of said septum—the parts being thus all in their normal, original position and ready to make another exposure. The cycle of operations described is, of course, repeated after each exposure.

To hold the rearmost plates in their upright position when the plate changer is in its outward position, I provide a yielding swinging arm 170 (see Fig. 11) which is pivoted at 171 to the magazine frame. This arm is adapted to be engaged by the inner end of the plate changer as it moves inwardly to move it out of the way and will automatically swing into its upright position upon outward movement of the plate changer.

Figure 11:
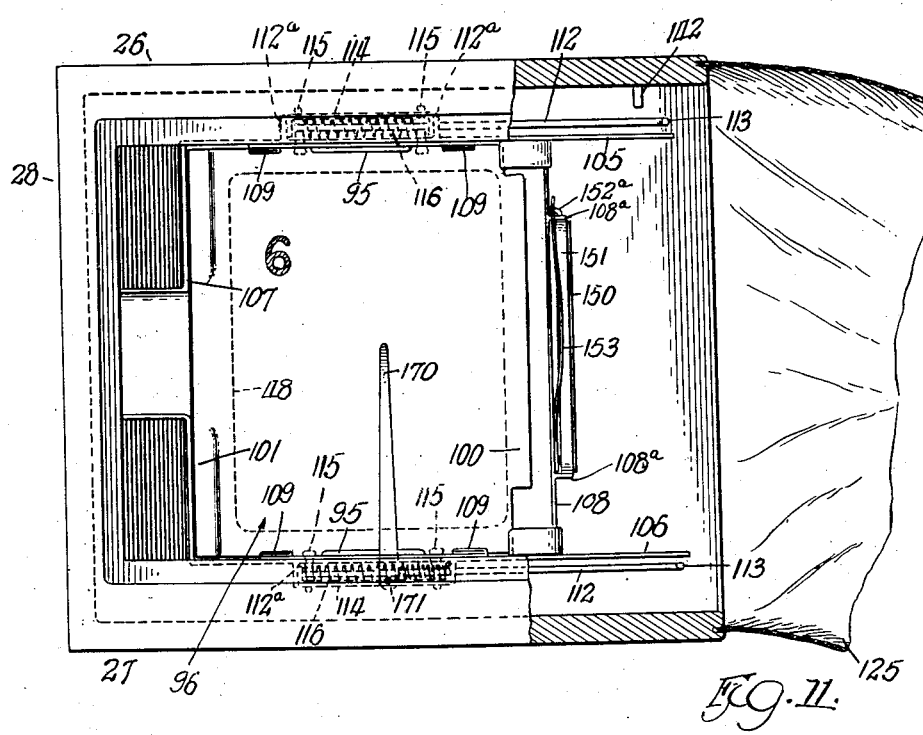
Figure 11 is a rear end elevation of my improved camera construction, with parts broken away.

To keep track of the number of plates exposed, each septum carries a number such as the number "6," as shown in Fig. 11, arranged in line with a hole 121ª in the plate changer 120, and a ruby glass sight opening 30ª in the door 30. Said door also carries a rotative ratchet counter wheel 30ᵇ (see Fig. 4) which is actuated by a spring pawl 121ᵇ carried by the plate changer, as said changer is moved inwardly, a second pawl 30ᶜ on the door holding the ratchet wheel against backward movement. Said ratchet has numbers, one for each plate, which numbers are visible through a second but smaller opening 30ᵈ in the door 30.

The plate changer 120, as shown herein and in the preferred construction, is connected with the crank handle 67, so that in the rotation of said handle, not only is the exposure made, as before described, but the exposed plate is removed from the shutter frame and a new plate is brought into position ready for the next exposure. This is brought about as follows: The shaft 62 before mentioned, extends at its bottom end through the bottom wall of the casing and is there provided with a radial arm 160. Said arm is connected by a link 161 to the short arm 162 of a horizontally swinging lever 163 (see Fig. 2) which is pivoted, intermediate its ends to the bottom wall 27 of the casing as at 163ª. The long arm 164 of said lever extends toward the rear of the camera and has pivotally connected to it, one end of a long link 165. The other end of said link is connected to an upright bar 166 fixed to the outside face of the end member 124 of the plate changer.

Thus as the lever 163 is actuated by the crank handle 67, it will, through the link 165, impart an outward and inward movement to the plate changer. As is apparent, this mechanism is located without the camera and therefore there can be no leakage of light into the camera by reason of its use.

When all the plates have been exposed, the plate changer is moved outwardly, after which the door 30 is opened and the septums removed therethrough. The exposed plates are removed from the septums and new ones substituted therefor, after which all the septums are again replaced in the magazine as before.

As will be seen from the foregoing, the entire operation of the camera, after it has been loaded with a plurality of sensitized members (in the case illustrated in the drawings—a plurality of sensitized plates) is automatic and is produced by the manipulation of a single operating member, as the crank 67. Manifestly the gearing, cams, levers and the like, comprising the several actuating devices, operated by said crank, must be suitably designed to bring about the movement of the various parts in the required timed relation.

Thus after the picture has been brought to proper focus on the screen comprised by the screen sections 81, 82, and after the shutter has been set,—the desired exposure opening having been determined by means of the thumb nut 76: The first part of the movement of the crank 67 brings the shutter frame, with the attached septum containing the sensitized plate, into the focal plane, at the same time swinging the screen sections 81, 82, into open position and out of the focal plane, in order that the sensitized plate may be brought into the focal plane. In the next further movement of the crank 67, the shutter is actuated and the exposure is made. Next the plate changer is moved outwardly to withdraw the rearmost unexposed plate from the rear end of the stack and at or about the same time the screen sections are closed and the shutter frame with the exposed plate are moved rearwardly to their original position, in time for the septum of the exposed plate to be engaged by the fingers 115 and moved backwardly into the magazine, as the plate-changer approaches its outermost positon. In the final movement of the crank, the plate-changer is moved inwardly and the septum with an unexposed plate, drawn from the rear of the stack by the plate-changer in its outward movement, is brought to position back of the shutter frame on which it is held by the spring clips 95 as described. This completes the cycle of operations and the camera is ready for another exposure.

As will be apparent, the plate changer may be operated by hand, if the mechanism connecting it with the operating crank be omitted. It is also capable of use with other types of cameras.

While in describing my invention, I have referred to many details of construction and of arrangement, it will be understood that these are in no way material, and that the invention is not limited thereto in any manner except as may be pointed out in the appended claims.

I claim as my invention:—

1. In a camera, in combination with the shutter and a device for operating the shutter, a magazine for supporting a plurality of sensitized members in the plane of the axis of the exposure area of the camera, changer mechanism for removing an exposed sensitized member and for replacing it by an unexposed sensitized member, and means for automatically actuating said changer mechanism in proper timed relation with said shutter operating device.

2. In a camera, in combination with the shutter and a device for operating the shutter, a magazine for supporting a plurality of septums in a position back of the exposure area of the camera each septum being adapted to hold a sensitized member, a changer mechanism for removing the rearmost septum in the magazine and for inserting it in place of the septum at the front of the magazine containing the sensitized member just exposed in the operation of the shutter, which septum and sensitized member is moved backwardly into the magazine, and means for automatically actuating said changed mechanism in proper timed relation with said shutter operating device.

3. In a reflex camera having a view opening in one side of the focal chamber, a movable focal plane shutter, a movable reflection screen normally located in the focal plane of the camera and covering the exposure area, yielding grips on the rear of said shutter frame for engaging a septum, means for moving said reflection screen to uncover said exposure area when the shutter frame is brought into the focal plane, a magazine open at the front adapted to contain a stack of septums, a plate changer for replacing the septum on the shutter after an exposure, with the septum at the rear end of the stack, a device for operating the shutter, and a mechanism for automatically moving said shutter frame and said screen and for operating said plate changer in proper timed relation with said shutter operating member.

4. In a reflex camera having a view opening in one side of the focal chamber, a movable focal plane shutter, a movable reflection screen normally located in the focal plane of the camera and covering the exposure area, means on said shutter frame for engaging and holding a sensitized member in the plane of its rear face, means for moving said screen to uncover the exposure area when said shutter frame is brought into the focal plane of the camera, a changer mechanism for replacing an exposed sensitized member by an unexposed sensitized member, a shutter operating member, and automatic mechanism for moving said shutter frame and screen and for actuating said changer mechanism in proper timed relation with said shutter operating member.

5. In a reflex camera having a view opening in one side of the focal chamber, a movable focal plane shutter frame and shutter normally standing back of the focal plane, a movable reflection screen normally located in the focal plane and comprising hinged sections covering the exposure area, said screen sections being mounted on the shutter frame and being adapted to swing away from the focal plane to uncover the exposure area when the shutter frame is moved into the focal plane, means on the rear of the shutter frame for engaging and holding a sensitized member in the plane of said shutter frame, means for moving the shutter frame into the focal plane of the camera, a changer mechanism for replacing an exposed sensitized member with an unexposed sensitized member, means for operating said changer mechanism, a shutter operating member, and mechanism connecting said shutter frame moving means and said changer mechanism to said shutter operating member for automatically actuating said shutter frame, screen and changer mechanism in proper timed relation with said shutter.

6. In a camera, in combination with the shutter and a device for operating the shutter, a magazine for supporting a stack of vertically disposed sensitized members in the plane of the axis of the exposure area of the camera, changer mechanism operating upon the rearmost unexposed sensitized member and moving it laterally away from the stack and back again into the exposed area of the camera in front of the foremost and now exposed sensitized member, and means for automatically actuating the changer mechanism in timed relation with said shutter operating device.

7. In a reflex camera having a view opening in one side of the focal chamber, a movable focal plane shutter, a movable reflection screen normally located in the focal plane of the camera and covering the exposure area, yielding gripping means on the rear of the shutter frame for holding a septum containing a sensitized member, means for actuating the screen to uncover the exposure area when the shutter is actuated, a magazine open at the front and adapted to hold a stack of vertically disposed loaded septums in the plane of the axis of the exposure area of the camera, changer mechanism operating upon the rearmost septum with an unexposed sensitized member therein and moving it laterally away from the stack and back again into the exposure area of the camera in front of the foremost septum with the now exposed sensitized member, means actuated during the movement of the changer in one direction for removing the foremost septum and exposed sensitized member from said yielding gripping means so as to permit the septum in the changer to be engaged with said gripping means, and means for actuating the shutter, the plate changer being operatively connected with said shutter actuating means.

In testimony that I claim the foregoing as my invention, I affix my signature in the presence of two witnesses, this 31st day of March, A. D., 1919.

GEORGE W. KAUSER.

Witnesses:
 EDITH A. BREEZE,
 T. H. ALFREDS.